Sept. 9, 1958 R. E. KIMES 2,851,220

TRANSISTOR COUNTING CIRCUIT

Filed Nov. 23, 1954 2 Sheets-Sheet 1

INVENTOR.
RICHARD E. KIMES
BY
Lippincott & Smith
ATTORNEYS

Sept. 9, 1958 R. E. KIMES 2,851,220

TRANSISTOR COUNTING CIRCUIT

Filed Nov. 23, 1954 2 Sheets-Sheet 2

INVENTOR.
RICHARD E. KIMES
BY
Lippincott & Smith
ATTORNEYS

United States Patent Office 2,851,220

Patented Sept. 9, 1958

2,851,220

TRANSISTOR COUNTING CIRCUIT

Richard E. Kimes, Concord, Calif., assignor to Beckman Instruments, Inc., South Pasadena, Calif., a corporation of California Application November 23, 1954, Serial No. 470,622

5 Claims. (Cl. 235—92)

This invention relates to transistor counting circuits and more particularly to transistor counting circuits wherein a plurality of transistors are interconnected to form a ring counter or a decade counter.

Certain types of transistors exhibit negative resistance over their active region which may provide the basis for circuits utilizing such transistors individually in binary circuits. By choosing certain values of external circuit components, such as load resistances, transistors exhibiting negative resistance as mentioned may be made to have two stable states, namely, a state of high current conduction, and a state of low current conduction. Such transistor bistable circuits may be changed from the high current conducting state to the low current conducting state, and vice versa, by the application of pulses of the proper polarity and sufficient amplitude to any of the three transistor element leads.

Circuits having more than two stable states can be built using single transistor binaries connected into a ring counter. These configurations generally have all but one binary in a normal or non-indicating state, either the high current conduction state or the low current conduction state. The abnormal or indicating state transfers from one binary to another as the count progresses. Virtually all ring circuits have the same logical design. The binaries in the ring are all driven from a common buss, and a common coupling means is used to prevent more than one binary being in the abnormal or indicating state. Ring corners differ primarily in the way in which this abnormal state progresses.

Various types of ring counters are known in the prior art. For example, one type of prior art transistor ring counter is the type which employs the D.-C. priming method. In such transistor ring counters one stage is in the indicating position, that is, for example, in a state of high current conduction, while the remaining stages are in a non-indicating position, that is, in the state of low current conduction. The stage in the indicating position primes the succeeding stage so that the succeeding input pulse brings the primed stage into the indicating position. At the same time the stage which was previously in the indicating position is brought into the non-indicating position, and the stage next succeeding the primed stage is brought into the primed condition. Such ring counters suffer from sensitivity to input pulse variations, are sensitive to the priming voltage amplitude, are ordinarily not operable at high speeds, and may be unreliable under adverse conditions.

Another type of prior art counter also employs the priming method. However, in this type priming is accomplished by a transient voltage developed by the indicating stage rather than by a D.-C. voltage. In such circuits, the output from the abnormal stage to the next stage is delayed. Such ring counters suffer from the disability that trigger pulses must arrive within a certain time sequence. Consequently, the counter cannot count random pulses and such counters also suffer from sensitivity to variations in the input pulses.

Still another type of prior art counter is the type wherein input pulses are applied to all stages and the stage which is in the abnormal or indicating state inhibits the output to the next stage. These counters, in common with those discussed previously, suffer from a sensitivity to input pulse variations and cannot be used at high speeds.

Other types of ring counters make use of a transfer pulse to change the succeeding stage from the normal to the abnormal state, and are not as sensitive to the magnitude, shape and duration of input pulses as the types already discussed hereinabove. In most such transfer pulse type counters, the trigger pulse is applied simultaneously to all stages and tends to bring all stages into the non-indicating or low current conduction state. At the same time the stage which was previously in the indicating or high current state develops a transfer pulse which is impressed on the succeeding stage and has the effect to bring the succeeding state into the high current condition. In transfer type circuits the magnitude and duration of the transfer pulse must be such to overcome the effect of the input pulse on the stage which is to be brought into the high current condition. In counters employing such transfer methods high counting rates are difficult because of the phenomenon known as "hole storage," and because of the inherent variable turn-off time of single-transistor binaries. In such counters, the turning off transient is the transient used to trigger the following binary. This transient is slow and variable, hence operation may be unreliable and transistor variations may cause failures.

In the present invention a ring counter is arranged so that the indicating or abnormal stage is the low current conduction state and the non-indicating or normal stage is the high current conduction state. Thus, all binaries are in the high current conducition state except one, namely, the abnormal or indicating stage which is in the low current conduction state. To advance the count, all binaries are pulsed to the heavy current conducting state and the pulse output of the indicating or abnormal binary upon such change to the heavy current state is used to drive the next binary into the indicating or low current conduction state. The turning-on transient used to effect this turning off is fast and of low impedance, and results in reliable operation. Increased power consumption results but is a small price to pay for the improvements obtainable.

It is a primary object of the present invention, accordingly, to provide an improved ring counter not subject to limitations inherent in prior known ring counting circuits, for example, which is not sensitive to variations in input pulse amplitude, shape or duration and can count high speed random pulses.

Another object of the invention is to provide a ring counter which, although employing only a single current multiplication transistor in each stage, is both stable and reliable in operation and needs no adjustments.

Another object of the invention is to provide a ring counter which will operate at high counting rates, for example, 100 kc. and upward.

A further object of the invention is to largely avoid the effects of "hole storage," and in addition to permit considerable variation in transistor parameters without failure.

Further objects of the invention are to provide a ring counter of small physical size and low power requirements, and are as well, those objects which will be apparent to those skilled in the art from the description and figures which follow, and from the claims appended hereto.

A ring counter, in accordance with the present invention, is comprised of individual stages, each employing a single current multiplication transistor arranged to be bistable. The transistor ring counter of the invention does not require priming. Each trigger pulse is impressed simultaneously on all the stages and tends to bring them all into the non-indicating condition. The transistor stage which was previously in the indicating condition develops a transfer pulse of sufficient amplitude and duration to override the impressed trigger pulse and thus bring the succeeding stage into the indicating condition.

The bistable circuit used in the ring counter of the invention is preferably triggered by applying trigger pulses simultaneously to the emitters in each stage. Positive pulses are used on said emitters since the function of the pulse is to change the indicating or abnormal stage, which is in the low current conduction or indicating state to the non-indicating or high current conduction stage. The collector of this stage rapidly rises in a few hundredths of a microsecond to almost the emitter supply voltage. The transient or transfer pulse developed across the load impedance from this rise is coupled to the next succeeding stage in such a manner that it causes this stage to go into the indicating or low current conduction state. The input pulse is also applied to this next succeeding stage, but a non-linear impedance such as a diode prevents the pulses from interacting and the time constants are arranged so that after the input decays the base input impedance or diode conducts the transfer pulse and triggers the next stage. The turning-on transient is a long low impedance pulse and triggers off the next succeeding stage even though said succeeding stage may have considerable "hole storage." The injection diode used to prevent interaction of the triggering and transfer pulses is also important to avoid loading the base and, furthermore, allows the binary to cut off noise or extraneous signals appearing on the base input, when properly biased. A second non-linear impedance such as a diode is preferably provided in the emitter supply to greatly increase the sensitivity to input pulses. Such an emitter diode also serves to clamp this point during triggering, or if a negative pulse appears on the input. A third non-linear impedance such as a diode is preferably provided in the bias supply to function as a D.-C. restorer for the base input coupling capacitor and, when included, allow rapid recharging of said coupling capacitor so that the next positive transfer transient can be fully effective. Also, this bias supply diode clamps the preceding collector for the negative transient or turning-off interval.

The stages as described hereinabove may be connected into any convenient configuration to provide ring counters or dividers of any desired counting or dividing capacity. They may, for example, be connected directly into a ring of ten to function as a decade counter. However, due to the number of parts necessary for each stage and due to the fact that the non-indicating state in each stage is the high current conduction state, certain economies of parts and power may be effected by using other configurations. A convenient configuration is a ring of five, followed by a ring of two. The only penalty to be paid for such a biquinary design is that the read-out conversion to light one of ten neon lamps requires ten diodes. However, the three stages eliminated by such a configuration would have required twelve diodes as well as other associated components, and hence there is a net saving of both parts and power. Due to the nature of the counting stages placing the ring of five first is desirable in order to gain the speed advantages available from a straight ring of ten circuit employing ten stages. It is also desirable to place the ring of five first to allow direct cascading of decades.

The novel features that are considered characteristic of this invention are set forth with particularity in the appended claims. The invention itself, however, both as to its organization and method of operation, as well as additional objects and advantages thereof, will best be understood from the following description, and the accompanying drawings, in which:

Figure 1:
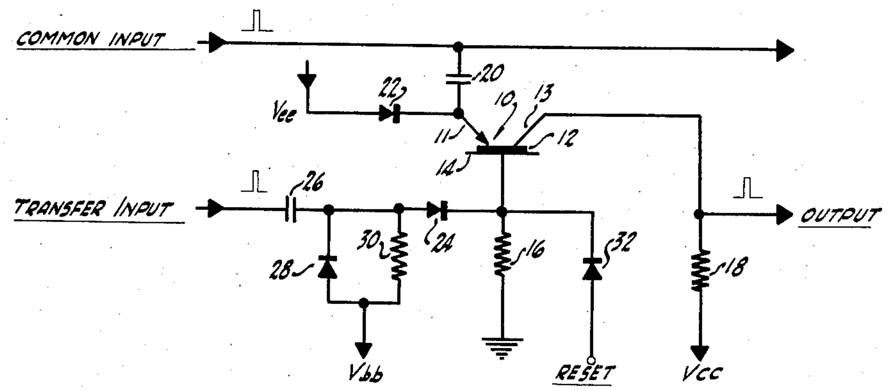
Fig. 1 is a circuit diagram of a typical stage of the counter.

Referring now to the drawings in which like elements are designated by the same reference characters throughout the figures, and referring particularly to Fig. 1 in the drawings, there is illustrated a single stage of the invention, comprising a bistable trigger circuit, including a transistor 10. Transistor 10 should be a current multiplication transistor and may, for example, be a point contact transistor, that is, a transistor of the type where the emitter and collector electrodes are both in rectifying contact with the semi-conducting body 12. A current multiplication transistor may be defined as a transistor where the short circuit collector current increments are larger than corresponding emitter current increments. The body 12 may consist of a semi-conducting material such as germanium, and preferably is of the N type, as will be assumed in the following discussion. Emitter 11, a collector 13 and base 14 are in contact with body 12. The details of manufacture and the mode of operation of a point contact transistor are well known, and will not be further described here.

Base resistor 16 is connected between base 14 and a source of reference potential, such as ground as indicated in Fig. 1. Emitter 11 is connected through a non-linear impedance, such as diode 22 to a source of negative operating potential $V_{ee}$. The positive terminal of the source of operating potential $V_{ee}$ is returned to the point of reference potential or ground. The collector 13 is connected through resistor 18 to a source of negative operating potential $V_{cc}$. The positive terminal of the source of operating potential $V_{cc}$ is also returned to the point of reference potential or ground.

Connected to the base 14 of transistor 10, in addition to resistor 16 is a non-linear impedance such as diode 24, forming part of a transfer pulse input circuit. Input capacitor 26 is in series with said diode 24, and preferably the source of operating potential $V_{bb}$ is connected to the junction of capacitor 26 and diode 24 through some arrangement such as resistor 30 in parallel with diode 28. The other terminal of source of operating potential $V_{bb}$ is returned to the point of reference potential or ground. Connected between emitter 11 and the point of reference potential or ground is a non-linear impedance such as diode 22 in series arrangement with the source of operating potential $V_{ee}$. Emitter 11 is also connected to the common input by means of capacitor 20. Sources of operating potential $V_{ee}$ and $V_{bb}$ are preferably of such a magnitude and so poled that a reverse bias appears on the emitter 11 and at the same time a small potential difference in the reverse sense appears across diode 24. Also connected to base 14, preferably through a non-linear impedance such as diode 32, is the reset means. The reset connection so shown and described is of course optional, as connection to any of the three transistor 10 elements might be employed for this function.

Figure 2:
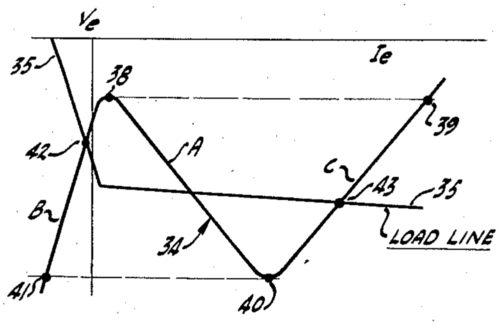
Fig. 2 is a graph illustrating the emitter current plotted as a function of the emitter voltage and showing the emitter loadline.

The operation of the bistable circuit shown in Fig. 1 may be explained by reference to Fig. 2 where the emitter current $I_e$ is plotted as a function of the emitter voltage $V_e$, and by reference to Fig. 3 where typical waveforms are illustrated. In Fig. 2, characteristic curve 34 has a negative resistance portion A, which is bounded on either side by positive resistance portions B and C respectively. Load line 35 represents the characteristics of diode 22, the steep portion on the left of Fig. 2 representing the non-conducting or back resistance of diode 22, and the nearly horizontal portion on the right representing the conducting or forward resistance of diode 22. Load line 35 is further shown intersecting characteristic curve 34 at points 42 and 43. These points 42 and 43 represent the stable operating conditions of the bistable circuit of Fig. 1. The intersection of load line 35 with the negative resistance portion A of characteristic curve 34 is instable.

Assuming that the bistable triggered circuit of Fig. 1 is in its indicating or low current conduction state, the operation of the circuit may be explained as follows: positive pulses are applied to the common input and through capacitor 20 to emitter 11 of transistor 10. Diode 22 is so poled as to be nonconducting during the application of these positive pulses. The pulses are of a sufficient amplitude to raise the potential on emitter 11 from point 42 in a positive direction to point 38 or higher and the circuit rapidly goes to its condition of high current conduction represented by some point such as 39, due to the regenerative common coupling between the emitter and collector circuits provided by base resistance 16. This rapid rise of current results in a positive pulse appearing across load resistance 18 and this positive pulse is coupled to the base of the succeeding stage.

The manner in which the bistable triggered circuit of Fig. 1 moves from its non-indicating or high current conduction state to its indicating or low current conduction state may likewise be explained by reference to Fig. 2. The circuit of Fig. 1 is returned to its low current conduction or indicating state only when there is a positive pulse appearing on the transfer input to base 14. Assuming such a positive pulse on the transfer input the action is as follows: both the positive pulse on the common input and the positive pulse on the transfer input are applied to transistor 10 at the same time. Isolation diode 24, however, prevents any interaction or cancelling between these two pulses. Only the highest pulse will appear on base 14. The time constant of the RC circuit comprised of capacitor 26 and resistances 30 and 16 is made longer than the time constant of the RC circuit comprised of capacitor 20 and resistances 16 and 18. Consequently, after the positive pulse applied via the common input to capacitor 20 has decayed, base input diode 24 will conduct and the positive transfer pulse applied via the transfer input to capacitor 26 will properly trigger the bistable circuit of Fig. 1 from point 43 to some point more negative than point 40 and the circuit will return to some point such as 41 in the low current conduction state, as shown in Fig. 2.

It is obvious from the above description that the common input may be applied to the base 14 and the transfer input to the emitter 11 providing that the time constants are reversed, that is, the time constant in such a case in the base circuit must be made smaller than the RC time constant in the emitter circuit, and providing also that negative pulses are used on the common input to base 14 and some means such as a transformer is used to reverse the polarity of the output transient applied on the transfer input to the emitter.

Figure 3:
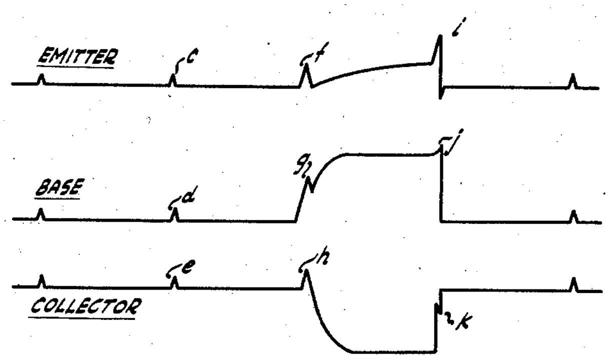
Fig. 3 illustrates the typical waveforms of a counter stage.

Fig. 3 illustrates the voltage waveforms at the emitter 11, the base 14, the collector 13 of a typical stage such as that shown in Fig. 1 during operation. The waveforms shown at *c*, *d* and *e* are the waveforms when the bistable circuit is in the non-indicating or high current conduction state. The small output pulses such as at *e* have no effect on the succeeding stage due to the bias existing across diode 24 as discussed hereinbefore. The waveforms shown at *f*, *g* and *h* are the waveforms resulting when, in addition to the positive pulse applied to the common input, a positive pulse is applied on the transfer input, triggering the bistable circuit into its indicating or low current conducton state. The waveforms shown at *i*, *j* and *k* are the waveforms resulting when the next positive pulse is applied to the emitter 11, triggering the stage back into the non-indicating or high current conduction state. The waveform at *k* also represents the transient which is coupled through coupling capacitor 26 and injection diode 24 to the base of the succeeding stage, triggering said succeeding stage into its indicating or low current conduction state.

Injection diode 24, in addition to preventing interaction between the triggering and transfer pulses in the particular stage to be triggered to its low current conduction state, avoids loading the base 14; furthermore, the magnitude of operating potentials $V_{ee}$ and $V_{bb}$ are preferably arranged so that there is a small potential difference in the reverse direction appearing across diode 24. This small potential difference allows the bistable circuit to cut off noise or extraneous signals appearing on the transfer input. Thus, for example, positive pulses appearing on the collector 13 of a stage in the high current conduction state will not be conducted to the base 14 of the following stage until the amplitude of such positive pulses is greater than the emitter and bias voltage difference ($V_{ee}$—$V_{bb}$) appearing across diode 24. Resistor 30 is desirable to insure that the aforesaid small potential difference appears across diode 24 and not elsewhere in the circuit such as across the diode 28. Diode 28 functions as a D.-C. restorer for the transfer input to the base 14. It rapidly recharges coupling capacitor 26 so that the next positive transient or transfer pulse can be fully effective. Also diode 28 clamps the preceding collector 13 for the negative transient or return to the low current conduction state.

Diode 22 in the emitter supply greatly increases the sensitivity of the bistable circuit of Fig. 1 to positive pulses applied via the common input. In addition, it clamps the potential on emitter 11 during triggering or if a negative pulse appears on emitter 11. Diode 22 serves as the emitter load and due to its nearly horizontal load line allows considerable turning point variations.

Increasing the value of collector load resistor 18 increases the amplitude of the positive transient used as a transfer pulse. However, this increase is limited in two ways. Collector load resistor 18 should be small to secure sufficient negative resistance as at A in Fig. 2 in order to insure reliable operation. Specifically, for a short circuit amplification factor greater than unity, collector load resistor 18 must be less in value than the difference in the internal transistor mutual and collector resistances. The other factor limiting the maximum value of resistor 18 is the permissible voltage variation at the output. With increasing values of collector load resistor 18, the collector 13 voltage during the low current conduction state begins to depend on the leakage current in the collector circuit during said low current conduction state. The minimum value of resistance 18, on the other hand, is limited by the fact that too small a value of resistor 18 will cause excessive collector 13 current in the high current conduction state and will cause the internal collector saturated resistance to effect the collector voltage during said high current conduction state. The value of collector load resistor 18 must fall within the limits set by these considerations.

Resetting ring counters is necessary at the beginning of each counting period and may be necessary during counting periods if through variations in transistor characteristics or other faults more than one stage is in an abnormal state. Resetting pulses are applied preferably through some diode such as 32 to the base 14. Diode 32 serves to avoid loading the base 14. This means of applying reset pulses is optional as pulses could also be applied to emitter electrode 11 or collector electrode 13 as well as to base electrode 14 as shown.

The size of base resistor 16 is governed by its effect on negative resistance. Increasing the resistance of base resistor 16 gives greater negative resistance. For fast triggering large amounts of negative resistance are desirable. On the other hand, base resistor 16 should be small enough to minimize variations in the upper turning point. The value of base resistor 16 actually chosen will represent a compromise between these two factors.

While it will be understood that the circuit specifications of the bistable triggered circuit of the invention may vary according to the design for any particular application, the following circuit specifications for the circuit of Fig. 1 are given for the purposes of illustration:

| | | |
|---|---|---|
| Base resistor **16** | ohms | 4700 |
| Load resistor **18** | do | 2700 |
| Bias resistor **30** | do | 4700 |
| Input capacitor **26** | micromicrofarads | 1000 |
| Input capacitor **20** | do | 100 |
| $V_{cc}$ | volts | −30 |
| $V_{bb}$ | do | −10 |
| $V_{ee}$ | do | −12 |

In a typical embodiment employing the above circuit specifications a value of 4700 ohms for the base resistor 16 was found large enough to develop sufficient negative resistance for fast triggering, but on the other hand, was small enough to minimize variations in the upper turning point 38. The negative resistance such as at A in Fig. 2 with a transistor 10 having a short circuit amplification factor of 1.7 and an internal collector resistance of 10,000 ohms in such an embodiment was −1200 ohms. The upper turning point (i. e., point 38 in Fig. 2) variation with a variation in the collector 13 internal cut-off resistance from 10,000 ohms to 60,000 ohms was 20% of the collector supply voltage $V_{cc}$. A collector load resistance 18 of 2700 ohms was sufficient to limit the high current conduction state current and to develop ample output voltage. It was still small enough, however, to maintain the saturation line relatively flat and the lower turning point (i. e., point 40 in Fig. 2) variations small. Variations in transistor 10 short circuit amplification factors from 1.5 to 3.5 resulted in variations in lower turning point voltage of only 20% of the emitter supply voltage $V_{ee}$. Base stabilization was not used to minimize cut-off voltage variations due to the fact that such stabilization resulted in a decrease of base resistance, poor triggering response, and unreliable operation.

Figure 4:
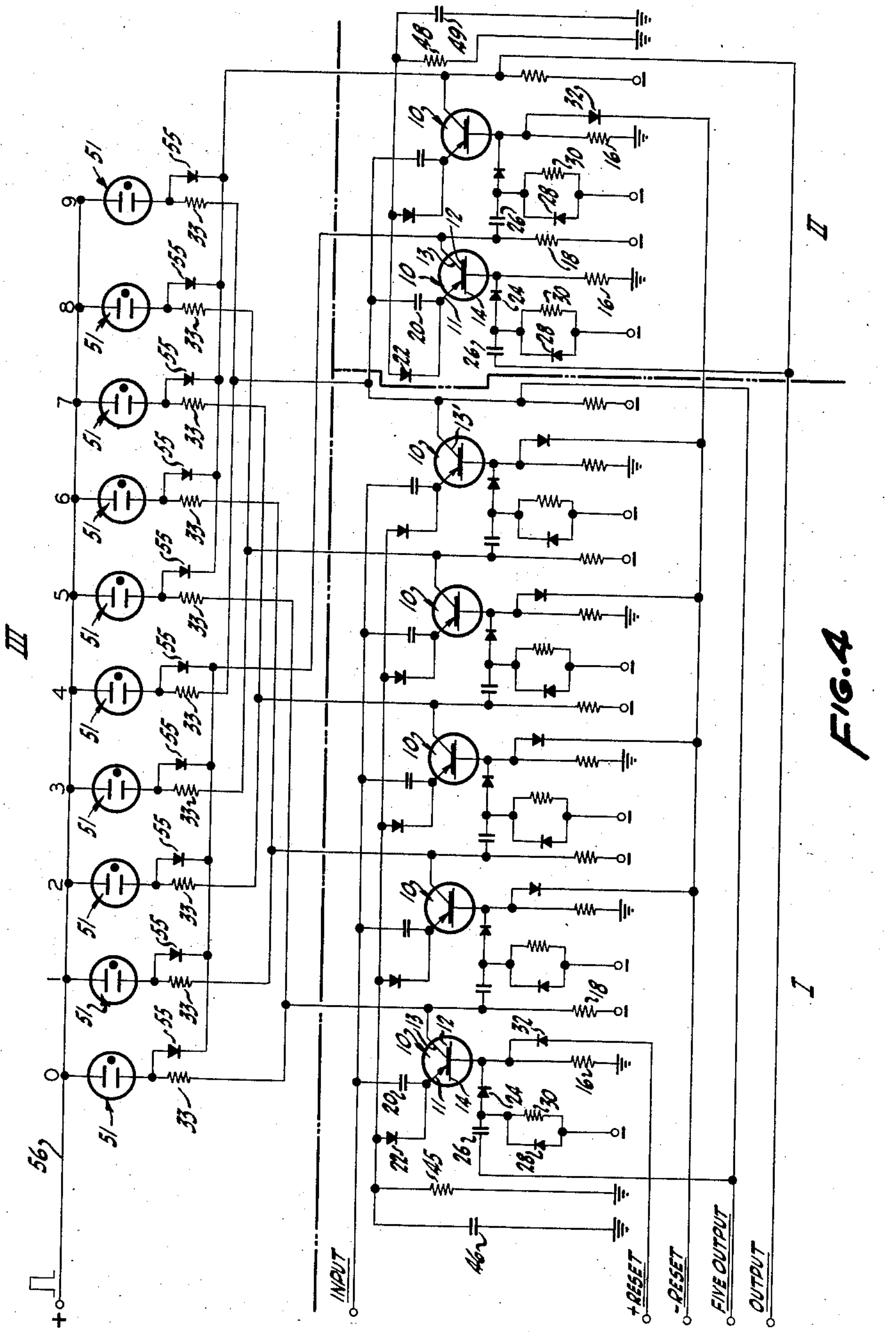
Fig. 4 is a circuit diagram of a decade counter wherein seven stages are interconnected in a ring of five followed by a ring of two and these rings used to operate a read-out system of ten neon lamps.

Referring now to Fig. 4, a decade counter employing a ring of five, ring of two configuration is there illustrated. The parts therein illustrated carry the same numbers as the corresponding parts of Fig. 1. Each stage is identical with every other stage, except with respect to the resetting function. The same numbers to indicate like parts have accordingly been used throughout. Dashed lines have been drawn in Fig. 4 to illustrate the various sections. The section indicated separated by said dashed lines in the lower left labelled I is the ring of five, the section so separated in the lower right labelled II is the ring of two, and the section above the dashed line labelled III is the neon light indicating section. With respect to the resetting function it will be noted that diode 32 of the first stage in the ring of five is poled to allow a positive reset pulse, which when applied will trigger this stage to the indicating or low current conduction stage. Diodes 32 on the other stages are poled so as to allow negative reset pulses, putting such stages in their non-indicating or high current conduction state prior to beginning a count.

The discussion hereinabove with respect to the bistable circuit of Fig. 1 applies as well to each of the stages illustrated in Fig. 4. In Fig. 4 the $V_{ee}$ of Fig. 1 is developed with respect to the ring of five by resistor 45, which is bypassed by capacitor 46. Resistor 45 has the high current conduction state current of four of the five stages flowing through it at all times. This current flow results in a voltage drop of the proper magnitude and polarity to bias the emitters 11 properly with respect to the point of reference potential, shown as ground in Fig. 4. Capacitor 46 serves to reduce the impedance of this circuit to a low value in order to secure the desired emitter load line characteristic, which is illustrated in Fig. 2 by characteristic curve 34. Similarly, in Fig. 4 the $V_{ee}$ of Fig. 1 with respect to the ring of two is developed by resistor 48, which is bypassed by capacitor 49. Resistor 48 is of a greater resistance value than resistor 45, since it must develop the same $V_{ee}$ voltage drop with the high current conduction state current of only one stage flowing through it. Capacitor 49 serves the same function with respect to resistor 48 as capacitor 46 serves with respect to resistor 45.

The description and operation of the individual stages of the ring of five, and the individual stages of the ring of two, are identical to the description and operation of the single stage of Fig. 1 which is illustrated and described hereinabove and said description will not be repeated here. The description applying particularly to Fig. 4 is the description which follows, wherein the interconnection between the ring of five of section I in Fig. 4 and the ring of two of section II in Fig. 4 and the interconnection of these two rings with the neon light indicator of section III of Fig. 4 is described and the operation thereof explained.

As discussed hereinabove, the turning off transient used as a transfer pulse is very rapid, the collector 13 of transistor 10 in any stage being returned to its state of low current conduction rising in a few hundredths of a microsecond to nearly the collector supply voltage $V_{cc}$. This results in rapid response to input pulses. For example, the resolution, which for our purposes may be defined as the ability of a counter to distinguish between adjacent input pulses, of a counter employing the particular values given by way of illustration hereinabove is of the order of less than ten miscroseconds. The recovery time for the bistable circuit of the invention is, however, somewhat longer. Placing the ring of five so that it receives the input pulses directly allows four times the minimum resolution necessary in a given arrangement for the recovery of any given stage before the next pair of pulses to be resolved occurs. For example, at a 100 kc. counting rate the time allowable for recovery in the arrangement of Fig. 4 is forty microseconds, and the necessary resolution is ten microseconds. Therefore connection in the manner illustrated allows high speed operation, and also direct cascading of counters.

Referring again to Fig. 4, it is seen that the input lead is connected through the capacitors 20 to each stage of the ring of five in section I. The collector 13 of each stage is connected through transfer input capacitor 26 and injection diode 24 to the base 14 of the following stage. In addition, the collector 13′ of the final stage of the ring of five of section I is coupled to the common input buss of the ring of two of section II, and through input capacitor 20 to the emitter 11 of each stage of said ring of two. Hence, the output of the ring of five serves as the common input to the ring of two, and drives said ring of two. The output used for this purpose is the transfer pulse output of the fifth stage, which pulse output is also used as a transfer pulse input to the first stage of the ring of five.

The collector 13 of each stage of the ring of five is connected to each of two indicating devices, such as neon lamps 51, through a series resistor 53. Similarly, the collector 13 of each stage of the ring of two is connected to the same point on each of five said indicating devices through a series diode 55. The other terminals of said indicating devices are connected to a common buss which is returned to a source of positive potential. The magnitude and polarity of this potential are so chosen that a relatively small potential change will reliably cause the neon lamp to fire.

Assuming that the first stage of the ring of five is in the indicating or low current conduction state, the potential appearing on the lead to the resistor 33 for the first and fifth indicator lights 51 will be substantially more negative than any of the potentials appearing on the other leads to resistors 33 from the ring of five. Diode 55 associated with the first indicator light 51 is connected to the collector 13 of the first stage of the ring of two of section II. Diode 55 associated with the fifth indicator light 51, on the other hand, is connected to the second stage of the ring of two of section II. Only one of the two stages of the ring of two will be in its indicating or low current conduction state. Assuming that the first stage of the ring of two is in said indicating condition, the potential appearing at its collector 13 and on the diode associated with the first indicator light will be more negative than the potential appearing at the collector 13 of the second stage and on the diode 55 associated with the fifth indicator light 51. Under these conditions the first neon light 51 will light and remain lit, until such time as either the potential on the resistor 33 or the potential on the diode 55 increases as, for example, when the first stage of either counter returns to its high current conduction state. In either of these cases the voltage across the first neon lamp 51 will fall below the regulating or minimum voltage for maintenance of ionization and lamp 51 will be extinguished. The diode 55 associated with the particular lamp 51 which is lit is the only diode 55 which is conducting, all other such diodes 55 being cut off.

While it was found that the neon light indicator section III would operate reliably as described hereinabove, such reliability was increased even more by reducing the positive voltage on common lead 56, which leads to one terminal of each lamp 51, and applying positive ionizing pulses to said common lead 56. Other means of introduction of such ionization pulses could be used, for example, they could be applied through isolating capacitors to the other terminal of each lamp 51. These ionization pulses may be at any convenient rate, one such convenient rate being, for example, 100 cycles per second, and such pulses must also be of a sufficient duration to cause ionization of the selected lamp 51 at the voltage existing on lead 56 during the time of their application.

The counting circuits described herein are capable of providing reliable operation at high speeds notwithstanding substantial variation in transistor parameters. The description herein describes a preferred embodiment of the invention but it should be understood that certain parts are included by way of preference only and, furthermore, that other forms of circuit elements are possible. Accordingly, the invention should not be limited except as defined by the following claims.

What is claimed is:

1. A fast-acting bistable trigger circuit comprising a transistor having an emitter and a collector and a base, first, second, third, and fourth circuit junctions having different electric potentials, the potentials of said second and third junctions being negative and the potential of said fourth junction being positive with respect to the potential of said first junction, a resistor connected between said base and said first junction, a resistor connected between said collector and said second junction, a first rectifier connected directly and poled for best conduction of current between said third junction and said emitter, second and third rectifiers connected in series and poled for best conduction of current between said fourth junction and said base, first and second switching-pulse input terminals, a series capacitor connected directly between said first input terminal and said emitter, and a series capacitor connected directly between said second input terminal and the circuit connection between said second and third rectifiers.

2. A fast-acting ring counter for counting electric pulses, comprising a plurality of transistors each having an emitter and a collector and a base, first, second, third and fourth circuit junctions having different electric potentials, the potentials of said second and third junctions being negative and the potential of said fourth junction being positive with respect to the potential of said first junction, a plurality of resistors respectively connecting each of said bases to said first junction, a plurality of resistors respectively connecting each of said collectors to said second junction, a plurality of rectifiers respectively connected and poled for best conduction of current from said third junction to each of said emitters, a plurality of series-connected pairs of rectifiers respectively connected and poled for best conduction of current from said fourth junction to each of said bases, an input terminal for receiving electric pulses, a plurality of capacitors respectively connecting each of said emitters directly to said input terminal, and another plurality of capacitors respectively connecting each of said collectors to the circuit connection between the said pair of rectifiers connected to the base of a succeeding one of said transistors.

3. A ring counter as defined in claim 2, having a bias resistor connected between said first and third junctions, whereby the negative potential of said third junction is provided by emitter current flowing through said bias resistor.

4. A decade pulse counter comprising a ring of two bistable transistor stages connected in tandem with a ring of five bistable transistor stages, each of said transistor stages having low-conduction and high-conduction stable operating states, only one at a time of the stages in each of said rings being in the low-conduction state, each of said transistor stages having a collector, ten gaseous-discharge indicating lamps each having first and second electrical terminals, a positive potential supply terminal connected to all of said first terminals, ten resistors connected in series with respective ones of said second terminals, said ten resistors being in five pairs, each pair being connected to a repective one of said collectors in said ring of five transistor stages, ten rectifiers connected to respective ones of said second terminals and poled for best conduction of current away from said terminals, said ten rectifiers being in two groups of five, each group of five being connected to respective ones of said collectors in said ring of two transistor stages, whereby only one at a time of said lamps is lit to indicate a decimal member represented by the conductive states of said transistor stages.

5. A decade pulse counter as defined in claim 4, wherein the potential of said supply terminal is pulsed.

References Cited in the file of this patent

UNITED STATES PATENTS

| | | |
|---|---|---|
| 2,436,963 | Grosdoff | Mar. 2, 1948 |
| 2,533,001 | Eberhard | Dec. 5, 1950 |
| 2,594,336 | Mohr | Apr. 29, 1952 |
| 2,644,896 | Lo | July 7, 1953 |
| 2,644,897 | Lo | July 7, 1953 |
| 2,670,445 | Felker | Feb. 23, 1954 |